United States Patent

Wickström

[11] Patent Number: 5,961,781
[45] Date of Patent: Oct. 5, 1999

[54] PROCESS FOR RECOVERING HEAT ENERGY BY CONDENSATION OF VAPOR AND DILUTION OF SODIUM HYDROXIDE USING A CONDENSING HEAT EXCHANGER SCRUBBING SYSTEM

[75] Inventor: Peter Wickström, Bromölla, Sweden

[73] Assignee: Stora Kopparbergs Bergslags AB, Falun, Sweden

[21] Appl. No.: 08/945,213

[22] PCT Filed: Apr. 24, 1996

[86] PCT No.: PCT/SE96/00542

§ 371 Date: Nov. 12, 1997

§ 102(e) Date: Nov. 12, 1997

[87] PCT Pub. No.: WO96/34235

PCT Pub. Date: Oct. 31, 1996

[30] Foreign Application Priority Data

Apr. 25, 1995 [SE] Sweden .................................. 9501508

[51] Int. Cl.$^6$ ...................................................... D21C 11/06
[52] U.S. Cl. ............................ 162/47; 165/113; 165/119; 422/173; 422/185
[58] Field of Search ............................ 162/14, 15, 30.11, 162/47, 375; 422/168, 173, 185; 165/113, 119, 913

[56] References Cited

U.S. PATENT DOCUMENTS

| | | | |
|---|---|---|---|
| 1,003,095 | 9/1911 | D'Equevilley-Montjustin | .......... 122/21 |
| 4,343,678 | 8/1982 | Franzen | ...................................... 159/24 |
| 4,363,219 | 12/1982 | Koseki et al. | ............................. 62/101 |
| 4,431,617 | 2/1984 | Farin | ........................................ 423/232 |
| 4,746,437 | 5/1988 | Koseki et al. | ........................... 210/640 |
| 4,755,258 | 7/1988 | Ryham | .................................... 159/47.3 |
| 5,368,096 | 11/1994 | Williams | .................................. 165/113 |

FOREIGN PATENT DOCUMENTS 26 51 900 B2 6/1977 Germany .
WO 91/18863 12/1991 WIPO .

OTHER PUBLICATIONS

Tappi Journal, "Reuse of Kraft Mill Secondary Condensates", Jul. 1988, pp. 53–58.
Kirk–Othmer, "Encyclopedia of Chemical Technology", vol. 9, 1980, pp. 85 to 87, John Wiley & Sons.

*Primary Examiner*—Dean T. Nguyen
*Attorney, Agent, or Firm*—Burns, Doane, Swecker & Mathis, L.L.P.

[57] ABSTRACT

A process of improving the heat efficiency by condensation of vapor in concentrated chemical solutions, according to which vapor and a concentrated chemical solution are introduced into an absorber comprising a cooler/condenser. In accordance with the invention, the condensate formed in the condensation process is utilized to dilute the concentrated chemical solution in the absorber, and the heat of condensation and the heat of solution generated from the dilution step are recovered by heat exchanged thereof with a heat-absorbing medium. A plant for performing the process is described, comprising an absorber (1) and a cooler (condenser) associated therewith, and at least one heat exchanger (3) having an inlet and an outlet for supply and withdrawal of a heat-absorbing medium. The plant has at least one inlet to the absorber (1) for supply of concentrated chemical solution, at least one inlet to the absorber (1) for supply of vapor, and at least one outlet from the absorber for withdrawal of a diluted chemical solution obtained through condensation of vapor and the chemical solution in the absorber (1).

3 Claims, 1 Drawing Sheet

PROCESS FOR RECOVERING HEAT ENERGY BY CONDENSATION OF VAPOR AND DILUTION OF SODIUM HYDROXIDE USING A CONDENSING HEAT EXCHANGER SCRUBBING SYSTEM

BACKGROUND OF THE INVENTION

Within the processing industry, such as the chemical industry and the cellulose industry, it is common practice to deliver the chemicals to the factories in solid form or in the form of highly concentrated aqueous solutions. Prior to use, the concentration of the chemicals usually is lowered by diluting then with water. In for instance pulp mills, large quantities of concentrated sodium hydrate are used and in the industrial plants in such mills large quantities of low-energy vapour are produced, i.e. vapour having a poor heat content. The low-energy vapour usually is utilised to produce hot water. In modern pulp mills, increasingly higher temperatures are requested, particularly in the bleaching plants. No doubt it would be an advantage to be able to utilise low-energy vapour in the preparation of comparatively diluted chemical solutions and at the same time increase their temperature to a level allowing them to be used directly in the production process.

WO 91/18863 discloses a process for the recovery of lower aliphatic acids, such as formic acid, and sugars from the spent cooking liquor from a pulping process carried out with these acids. Spent cooking liquor is evaporated in several steps in a multiple effect evaporator wherein the vapour is returned to previous stages and heats and dilutes the cooking liquor. This publication is silent with ragard to the possibilitty of elevating the boiling points in order to recover maximum thermal energy from the system. Instead, the purpose of the invention described in that publication is to recover acids and sugars.

U.S. Pat. No. 4,755,258 describes multiple effect evaporation of spent liquor, wherein the formed vapour is restored to previous stages and heats the liquor. An advantage is said to be that the dry solids contents of the spent liquor remain nearly unchanged. The plant in accordance with this prior-art publication does not either make use of the boiling-point elevation to recover high-quality energy.

SUMMARY OF THE INVENTION

The primary purpose of the subject invention is to provide a process and a plant for efficient recovery of energy upon dilution of liquids having a considerable elevation of boiling points.

The invention is based on the idea that by condensing vapour in a liquid containing chemicals while simultaneously making use of the condensation heat and the heat of solution generated during the dilution it becomes possible to produce hot water having a higher temperature than the vapour.

Before giving a detail description of the invention some definitions of the terms used herein will be explained.

For instance, the expression "elevation of boiling points" designates the difference in boiling temperatures obtained when boiling an aqueous solution of a chemical and when boiling pure water at identical pressures.

The expression "chemical" is to be given a wide interpretation and relates to water-soluble organic or inorganic compounds and mixtures thereof. As non-limiting preferred examples of such chemicals may be mentioned sodium hydroxide and sulphuric acid.

BRIEF DESCRIPTION OF THE DRAWINGS

The invention will be described in closer detail in the following with reference to the accompanying drawings, wherein.

DESCRIPTION OF THE PREFERRED EMBODIMENTS

Figure 1:
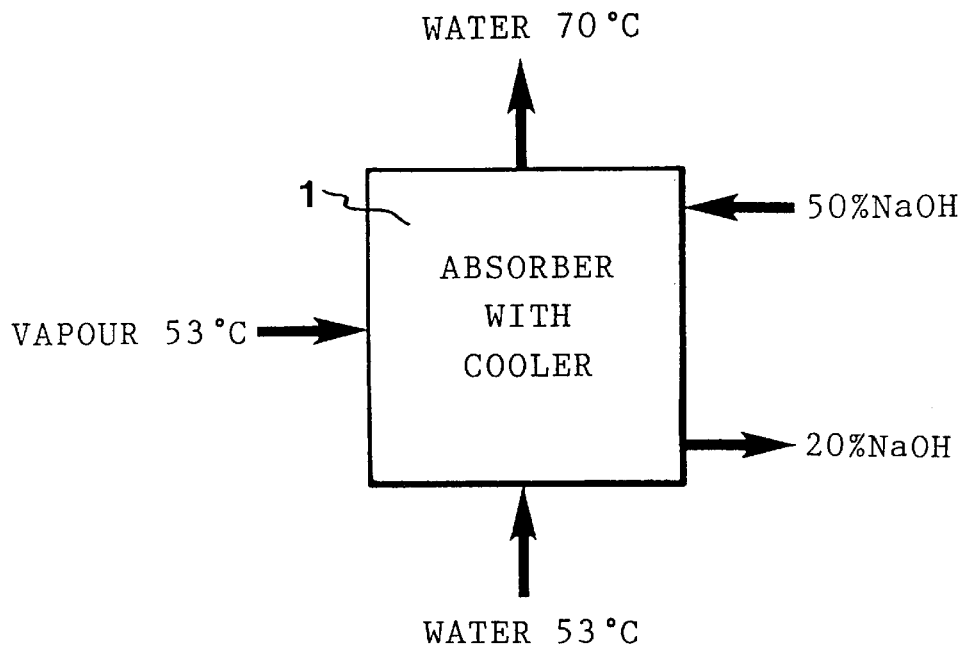
FIG. 1 is an overall flow chart illustrating one example of application of the invention within the pulp industry.

Referring to FIG. 1, vapour is introduced into an absorber 1 comprising a cooler (not illustrated). The vapour has a temperature of approximately 53° C. and is formed by the outflow vapour from an evaporator which is supplied with polluted liquor vapour at a temperature of approximately 58° C. This cleaning step is not necessary if the liquor vapour purity is regarded as acceptable. At the same time, a 50% sodium hydrate solution is introduced into the absorber. The condensate that forms in the absorber upon condensation of the vapour therein is used to dilute the 50% concentration liquor and liquor at 20% is withdrawn from the absorber. Hot water having a temperature of about 53° C. is used as the medium for absorption of the heat that generates as a consequence of the condensation and the heat of solution from the dilution, and this hot water is introduced into an heat exchanger (not shown) positioned in or adjacent to the absorber, through a separate inlet and is withdrawn through a separate outlet in the form of hot water having a temperature of about 70° C. The heat exchanger may for instance be a tube heat exchanger, wherein the hot water circulates inside the tubes and vapour and liquor externally thereof. The above values of concentration, temperatures, etc., are to be regarded as examples only. The Table below gives examples of various boiling point elevation values and parameters related thereto.

Table of Boiling Point Elevation

| Parts NaOH | Parts water | % NaOH | Boiling point elevation °C. | Liquor temperature °C. |
| --- | --- | --- | --- | --- |
| 1 | 1 | 50 | 43 | 96 |
| 1 | 1.5 | 40 | 25 | 78 |
| 1 | 2 | 33.3 | 15 | 68 |
| 1 | 3 | 25 | 9 | 62 |

The values given in the Table above indicate that the higher the elevation of boiling points, i.e. the higher the liquor concentration, the higher the air temperature and the amount of energy that may be recovered. The chemical solution that is introduced into the absorber should have a concentration of between 20% and the concentration of saturation, and preferably between 30 and 50%.

Figure 2:
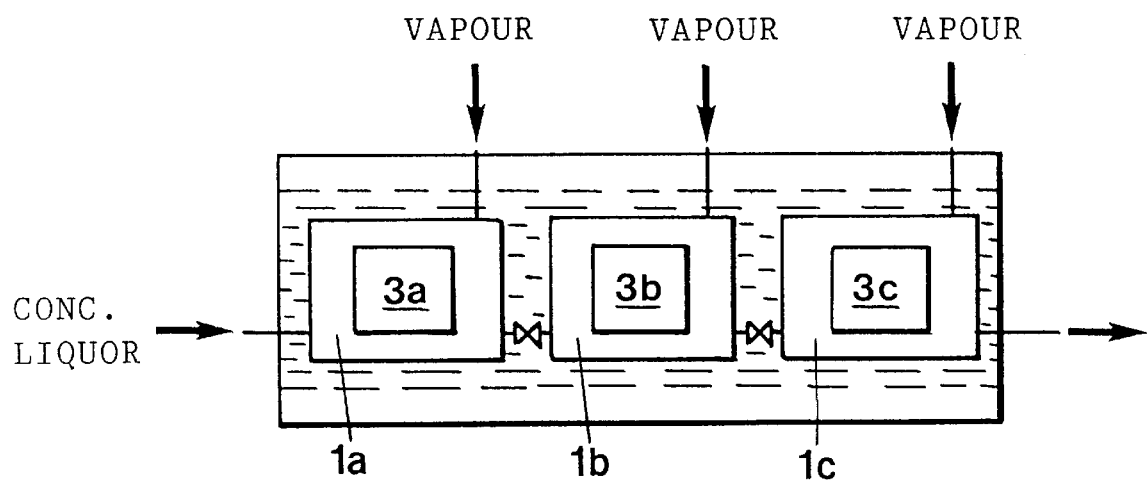
FIG. 2 is a schematic view of a preferred plant for performing the process in accordance with the invention, using an absorber of multi-compartment type.

FIG. 2 illustrates schematically one embodiment of a plant, chosen by way of example and designed to perform the process in accordance with the invention. The absorber 1 is divided into three compartments, 1a, 1b, 1c, and one heat exchanger 3a, 3b, 3c is connected to each compartment. The various compartments are interconnected.

Vapour having a normal condensation temperature of 53° C. is introduced into all compartments, and is condensed in the liquid contained inside the compartments. The condensation heat is withdrawn via the heat exchanger associated with the respective compartment. A 50% sodium hydroxide solution is added to compartment 1a. Upon condensation of the vapour thus supplied the liquor is diluted to a concentration of 40%. The elevation of the boiling point increases the temperature of the compartment to a level above that of the condensation temperature, however to a maximum of 78° C. Practically all condensation heat is withdrawn by way of the associated heat exchanger. From compartment 1a 40% sodium hydroxide is supplied to compartment 1b. The vapour condenses and heat is drawn off in the same manner as described above. In this compartment, the liquor is diluted to a concentration of 33.3%. As a result of the dilution, the temperature drops to a maximum of 68° C. Surplus liquor is passed to compartment 1c. In this compartment, the sodium hydroxide is diluted to a concentration of 25%. The temperature drops to a maximum of 62° C. In this example, the condensation heat is used to heat the hot water. Water having a temperature of 45° C. is added to the heat exchanger in compartment 1c, and is sequentially heated further, first in compartment 1b and finally in compartment 1c, to a temperature of 70° C. See Table below.

TABLE

Basis of calculation: 1 ton 100% liquor

|  | Total | Compartment 1 | Compartment 1b | Compartment 1c |
|---|---|---|---|---|
| Supplied sodium hydroxide solution |  |  |  |  |
| Part by weight of sodium hydroxide, % | 50 | 50 | 40 | 33.3 |
| Sodium hydroxide, ton | 1.00 | 1.00 | 1.00 | 1.00 |
| Water in sodium hydroxide | 1.00 | 1.00 | 1.50 | 2.00 |
| Temperature, °C. | 20 | 78 | 68 | 62 |
| Condensing vapor, in ton | 2.00 | 0.50 | 0.50 | 1.00 |
| Withdrawn sodium hydroxide solution |  |  |  |  |
| Part by weight of sodium hydroxide, % | 25 | 40 | 33.3 | 25 |
| Elevation of boiling points, °C. |  | 25 | 15 | 9 |
| Sodium hydroxide, ton | 1.00 | 1.00 | 1.00 | 1.00 |
| Water in sodium hydroxide | 3.00 | 1.50 | 2.00 | 3.00 |
| Temperature, °C. | 62 |  |  |  |
| Hot water |  |  |  |  |
| Input temp., °C. | 45 | 65 | 58 | 45 |
| Output temp., °C. | 70 | 70 | 65 | 58 |
| Hot water quant. | 40 | 40 | 40 | 40 |

In summary, essential advantages are obtained in accordance with the invention in that all energy in the process, with the exception of inevitable losses, is transformed into high-quality energy, and this is achieved while using a smaller number of units than in accordance with prior-art technology. This in turn gives considerable savings in primary heat, evaluated to be in the order of 2 MSEK yearly in a normal-size pulp mill alone.

The primary advantage of the invention is that in one and the same process it becomes possible to make use of the secondary heat more efficiency while at the same time the desired dilution of chemicals is obtained. In accordance with the invention the elevation of boiling points thus has been taken advantage of in a most efficient manner.

I claim:

1. A process of improving the heat efficiency by condensation of vapor in concentrated sodium hydroxide solutions in a plant in the cellulose industry, comprising introducing vapor and a concentrated sodium hydroxide solution into an absorber comprising a condensing cooler, diluting the concentrated sodium hydroxide solution in the absorber using condensate formed by condensation via the condensing cooler to provide diluted sodium hydroxide solutions for use in other places in the plant, recovering the heat of condensation and heat of solution generated from the dilution step by exchanging heat with water as a heat-absorbing medium in a heat exchange means and forming a high-temperature hot water, wherein the temperature of the hot water exceeds the temperature of the vapor introduced to the absorber.

2. A process as claimed in claim 1, wherein the concentrated sodium hydroxide solution introduced to the absorber has a concentration of between 20% and the concentration of saturation.

3. A process as claimed in claim 1, wherein the concentrated sodium hydroxide solution introduced to the absorber has a concentration between 30 and 50%.

* * * * *